United States Patent [19]

Holzberger

[11] Patent Number: 4,791,947

[45] Date of Patent: Dec. 20, 1988

[54] AUTOMOTIVE PARTS CLEANING DEVICE WITH ASBESTOS RESIDUE COMPARTMENT

[76] Inventor: George Holzberger, Rte. 55, LaGrangeville, N.Y. 12540

[21] Appl. No.: 48,259

[22] Filed: May 11, 1987

[51] Int. Cl.⁴ .............................................. B08B 3/04
[52] U.S. Cl. .................... 134/123; 134/172; 312/31
[58] Field of Search ............... 134/109, 123, 172, 173, 134/111; 160/23 R, 351, 127, 128, 290 R; 312/31, 1; 15/345

[56] References Cited

U.S. PATENT DOCUMENTS

| | | | |
|---|---|---|---|
| 2,385,393 | 9/1945 | Wilson | 134/111 |
| 2,627,862 | 2/1953 | Hoerner | 134/111 |
| 3,133,306 | 5/1964 | Pitts | 134/123 |
| 3,168,247 | 9/1962 | Schild | |
| 3,378,019 | 4/1966 | Riolo | |
| 3,563,594 | 2/1971 | London | 160/23 R |
| 3,653,685 | 4/1972 | Friend | 160/127 |
| 4,029,115 | 6/1977 | Wheeler | |
| 4,105,342 | 8/1978 | Plourde | |
| 4,464,256 | 8/1984 | Plourde | |
| 4,626,291 | 12/1986 | Natale | 312/1 |

FOREIGN PATENT DOCUMENTS

| | | | |
|---|---|---|---|
| 2643067 | 3/1978 | Fed. Rep. of Germany | 15/345 |
| 2917663 | 12/1980 | Fed. Rep. of Germany | 15/345 |
| 2346061 | 10/1977 | France | 15/345 |

*Primary Examiner*—Harvey C. Hornsby
*Assistant Examiner*—Corinne M. Reinckens
*Attorney, Agent, or Firm*—Schmeiser, Morelle & Watts

[57] ABSTRACT

A portable cleaning device for automotive parts. The device contains an asbestos residue compartment and an extendable/retractable catch basin for movement to the desired distance from the work piece. A transparent shield separates the user from the work piece, the shield has corner magnets at one end for attachment to the car wheel well. A hand held cleaning implement, out of which a cleaning fluid is pumped at low pressure, is used to clean the work piece. Magnets centrally located on the shield may be used to secure the shield to the catch basin.

7 Claims, 2 Drawing Sheets

4,791,947

AUTOMOTIVE PARTS CLEANING DEVICE WITH ASBESTOS RESIDUE COMPARTMENT

FIELD OF THE INVENTION

Generally this invention relates to automotive parts washers and more specifically to a portable parts washer especially for brake drums and clutches which protects the user from asbestos dust and residue.

While car parts washers have been available in one form or another virtually since the beginning of the automotive industry recent observations have required advancements in the field. Of most importance, has been the discovery that asbestos can have dire effects on one's health, especially when inhaled as dust particles.

With such discoveries came the surprising realization that individuals and particularly automotive mechanics have been subjected to severe health risks when cleaning brake drums and clutches. These portions of the automobile traditionally use asbestos and where there is wear, as there is in almost every case, asbestos dust particles are formed. When cleaning such devices the automotive mechanic traditionally removed the worn parts and brushed away the dust, being unaware of the health hazards he was subjecting himself to by inhaling such dust.

Further exacerbating the problem was the use of air hoses by numerous automotive mechanics to clean such parts. In there situations, the dust particles were spread throughout the entire work area, endangering all individuals in that vicinity.

While numerous parts washers are available, none have sufficiently met the problems and health hazards posed by the cleaning of parts having an asbestos residue. For example, many parts washers simply use a basin which require the parts to be removed and placed within the basin. In the present situation this is totally inappropriate since the removal of the parts prior to removing the asbestos residue will cause the dust to become airborne.

Other parts washers use high pressure washing techniques to virtually blast work surfaces clean. Such high pressure blasting washers once again cause the asbestos dust to become airborne during the cleaning process.

Thus, while numerous attempts have been made to produce a variety of parts washers, with the result that such washers are now extremely complex and expensive, none of those presently available solve the above described problem.

It is therefore an object of this invention to provide a safe and easy parts washer which can be used for cleaning asbestos residue from brake drums and clutches.

Another object of this invention is to provide a parts washer which will sufficiently protect the user from asbestos residue and dust.

Another object of this invention is to provide a parts washer wherein the residue asbestos can be easily disposed of.

Another object of this invention is to provide an automotive parts washer for cleaning asbestos residue which is adaptable to virtually all automobiles.

This and other objects of the invention will become obvious as one considers the various applications disclosed and works with the invention. However, the scope of the invention is intended to be only limited by the appended claims.

SUMMARY OF THE INVENTION

It has been found that the objects of this invention may be accomplished by providing a portable parts washer with an extendable/retractable basin that may be raised toward the part to be cleaned. Such a basin not only receives all liquid dripping from the washed part but may in fact be raised to bathe the lower portion of any asbestos laden part when the basin is filled with cleaning fluid. The basin communicates with a container which receives the liquid and the asbestos in suspension. A pump draws liquid from the upper portion of the container thereby dispensing a clean fluid since the asbestos residue quickly settles in the container.

Protection is provided to the user by means of a shield which may be raised in front of the work piece and attached by magnets to the automobile wheel well. Another hand shield about one end of the hose protects the users arm from contact with the asbestos residue. The pump which draws liquid from the container provides a low pressure dispensing of cleaning fluid so as to not cause the asbestos particles to become airborne.

In one embodiment the shield contains an apron one end of which may be placed in the basin to direct any liquid contacting the shield down into the basin. To maintain the apron within the basin, magnets toward the center of the shield attach to the metallic basin.

The accompanying drawings, referred to herein and constituting a part hereof, illustrate preferred embodiments of the invention, and together with the description, serve to explain the principles of the invention.

DESCRIPTION OF THE PREFERRED EMBODIMENTS

Figures 1, 1A:
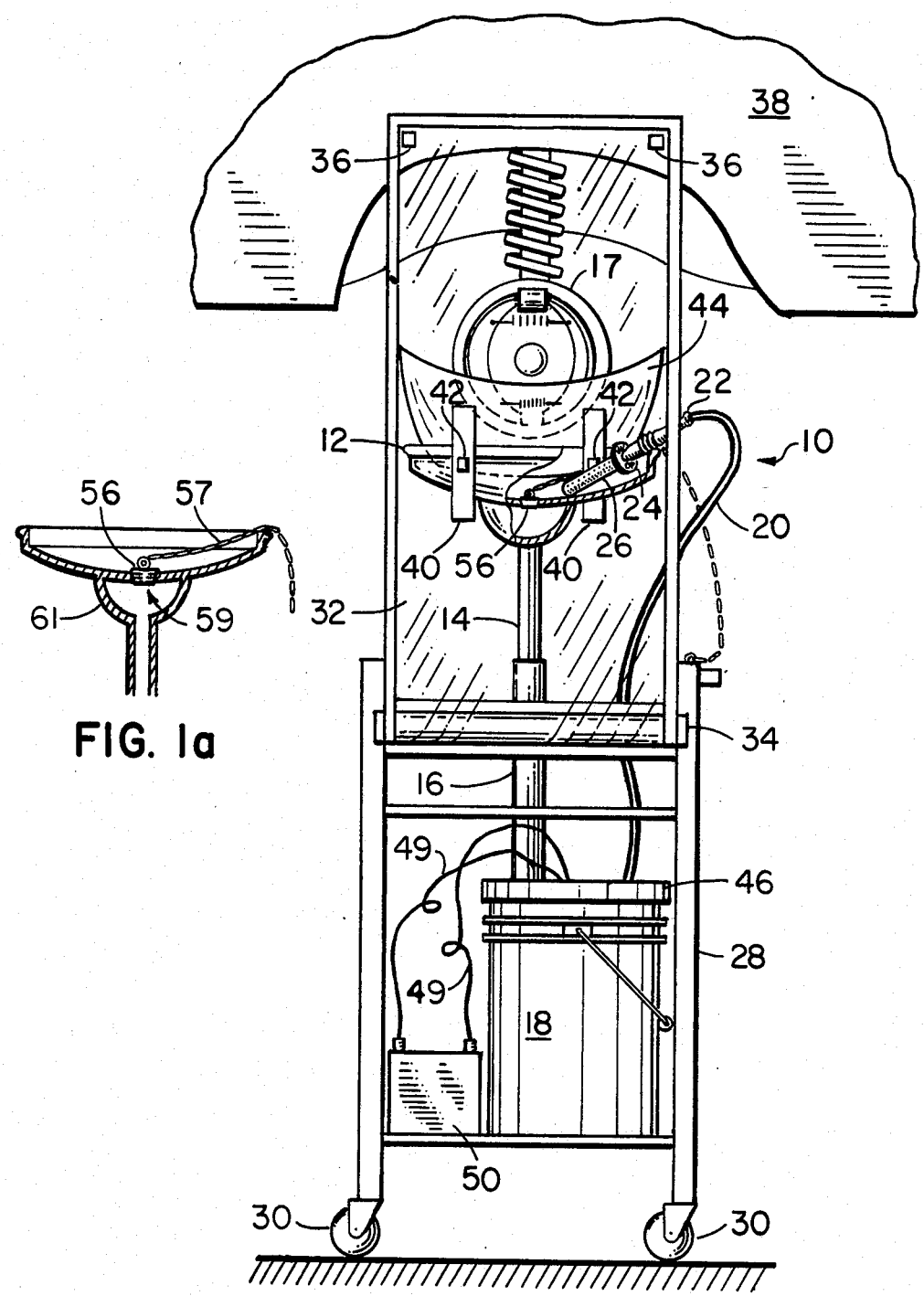
FIG. 1 is an elevational view of the invention in its operative position.
FIG. 1a is a cross sectional view of the basin 12 of this invention.

Referring now more particularly to FIG. 1 of the accompanying drawings, the cleaning and storing device is generally designated as 10. This device has a catch basin 12 which is supported by a first conduit 14 which in turn is pressure fit into a second conduit 16. The friction between the first and second conduit is sufficient to support the catch basin 12 even when it is full of liquid. However, a more positive locking arrangement may be obtained by using a hand operated set screw placed in the second conduit 16 so as to engage the first conduit 14 and secure both conduits in a fixed relationship. The first conduit slides within the second conduit so as to move the catch basin 12 between an extended position as shown in FIG. 1 and a retracted position wherein the catch basin 12 rests on top of the second conduit 16. This enables the user to raise the catch basin to a desired location beneath the work piece, which in FIG. 1 is a brake drum 17. Should it be desirable, the catch basin may be filled with cleaning liquid and raised sufficiently to actually bathe the lower portion of the brake drum or any other accessible portion of the vehicle as shown in FIGS. 1 and 1a plug 56 is attached by a chain 57 to basin 12. The basin is suitable for holding fluid to bathe the drum or associated parts when the plug 56 is inserted into the outlet 59 of basin 12. This outlet 59 leads into exit conduit flare 61 of conduit 14.

Figure 2:
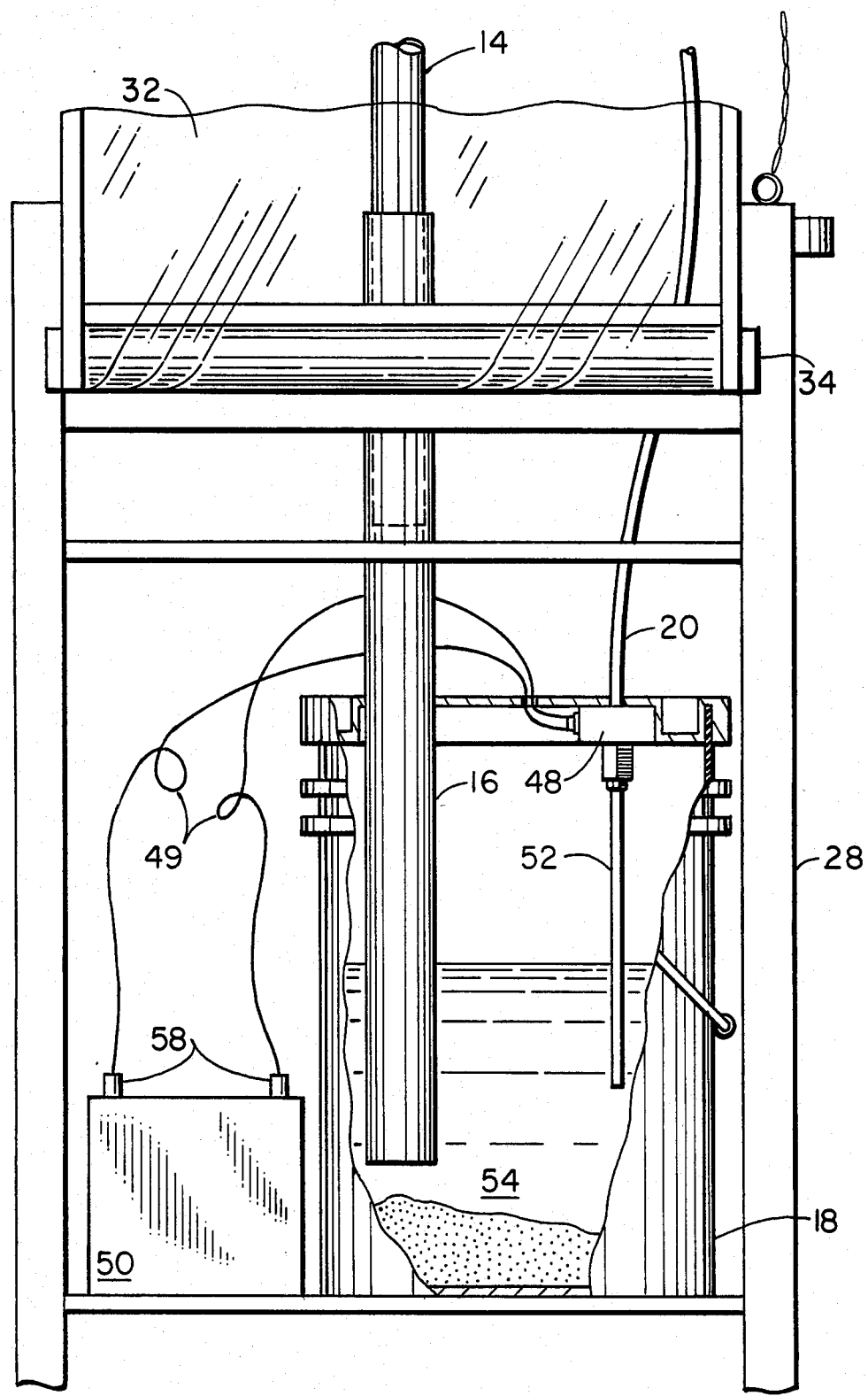
FIG. 2 is a fragmentary, elevational view of the lower portion of the invention.

The second conduit leads into a container 18 which is shown in greater detail in FIG. 2. A hose 20 is secured to a pump 48 in container 18. Toward the free end of the hose is a handle 22 and at the end of the handle 22 is a hand shield 24. The free end of the hose is adapted to receive a cleaning element such as element 26. This cleaning element may be of a variety of types including a sponge, brush or a combination implement wherein the far end is a sponge and the end closer to the handle is a brush. Liquid being dispensed through the hose 20 will flow our of cleaning element 26.

As also shown in FIG. 1 the cleaning device includes a movable stand 28 which rests upon rollers 30.

A transparent shield 32 is wound upon a take up roller 34 which is rotatably secured to the side of the stand 28. The other end of the transparent shield 32 contains corner magnets 36 at each corner of the shield. These magnets serve to secure the shield to the wheel well of the automobile 38.

Centrally located on the shield are vertical compartments 40 which each contain a basin magnet 42. These magnets are slidably located within the vertical compartments 40 for attachment to the basin at a variety of heights.

A transparent apron 44 is secured to the side of the shield adapted to face the work piece. The apron is secured along one end to the shield. The other end of the apron is positioned to lie within the basin so that any liquid flowing down the shield will be directed into the catch basin 12.

FIG. 2 discloses the bottom portion of the stand along with a fragmentary view of the container 18.

Located in the lid 46 of the container 18 is a pump 48. This pump is powered through lines 49 by a battery 50. In its most simplified form the pump 48 is activated by simply connecting both leads 58 to the battery 50. However, it should be appreciated that it would be very easy to simply attach an external switch for accomplishing the same purpose.

The second conduit 16 is positioned in the container so as to be closer to the bottom of the container than the end of the pump pipe 52 which draws liquid 54 from the container for dispensing from hose 20.

The liquid may be any suitable cleanser suitable for use with asbestos. The pump provides only a low pressure dispensing of liquid so that the liquid flows slowly out of the cleaning implement 26 and does not scatter the asbestos dust located on the brake drum 17.

In operation, the user wheels the stand 28 beneath brake drum 17. Catch basin 12 is extended to the desired distance below the work piece. Shield 32 is raised and secured by means of magnets 36 to the wheel well of automobile 38. Apron 44 is placed in the basin and basin magnets 42, which are beneath the apron are attached to the basin. Cleaning element 26 is placed in basin 12 and lines 49 are connected to leads 58 of battery 50, powering pump 48. Pump 48 draws cleaning liquid 54 from the upper portion of container 18 through pipe 52 and dispenses the liquid through hose 20 and out of the cleaning element 26. The user simply takes handle 22 and gently rinses the asbestos residue from the work piece. Once the asbestos is saturated the user may brush it loose from the work piece without cause asbestos dust.

Assuming the plug 56 (as shown in FIG. 1) is not used to close the basin the liquid will flow through the conduits 14 and 16 into the container 18 along with the asbestos residue. This residue will accumulate in the bottom of the container as a sludge and after a number of uses the liquid may be drained off and the sludge simply dumped out of the container 18 into a protective storage container.

The invention in its broader aspects is not limited to the specific embodiments herein shown and described but departures may be made therefrom within the scope of the accompanying claims, without departing from the principles of the invention and without sacrificing its chief advantages.

I claim:

1. A device for cleaning brake drums and clutches and storing residue asbestos from said cleaning comprising:
   a catch basin moveable between an extended and retracted position;
   a container, communicating with said catch basin through a conduit, one end of said conduit secured to and opening into said latch basin, the other end of said conduit disposed within the container;
   a hose, one end of which is secured to a pump, the other end of said hose adapted to receive a cleaning implement.
   pump means for drawing liquid from the container through a pipe within the container, a predetermined distance from the bottom of said container, and dispensing the liquid through the hose and out of the end adapted to receive the cleaning implement;
   a moveable stand adapted to receive said cleaning device;
   a transparent shield capable of extension and retraction, one end of said shield secured to the stand the other free end of the shield having at least one magnet therein for securing said free end to the workpiece whereby the user is shielded from the workpiece and cleaning device, the secured end of the shield being attached to a take up roller;
   a least two vertical compartments within the shield and located toward the center of said shield each compartment containing a basin magnet for securing the shield to the catch basin; and
   an apron on the side of the shield adapted to face the work piece, said apron secured along one end to the shield the other end of said apron being free for insertion into the basin.

2. The invention of claim 1 further comprising:
   a moveable stand adapted to receive said cleaning device; and
   a transparent shield capable of extension and retraction, one end of said shield secured to the stand the other free end of the shield having at least one magnet therein for securing said free end to the workpiece whereby the user is shielded from the workpiece and cleaning device.

3. The invention of claim 2 wherein the secured end of the shield is attached to a take up roller and said invention further comprises:
   at least two vertical compartments within the shield and located toward the center of said shield, each compartment containing a basin magnet for securing the shield to the catch basin; and
   an apron on the side of the shield adapted to face the workpiece, said apron secured along one end to the shield the other end of said apron being free for insertion in to the basin.

4. The invention of claim 1 further comprising:

a handshield secured toward the end of the hose which is adapted to receive the cleaning implement.

5. The invention of claim 4 wherein the conduit is secured such that the end of the conduit in the container is closer to the bottom of the container than is the end of the pipe.

6. A device for cleaning brake drums and clutches and storing residue asbestos from said cleaning comprising:

a catch basin moveable between an extended and retracted position;

a container, communicating with said catch basin through a conduit, one end of said conduit secured to and opening into said latch basin, the other end of said conduit disposed within the container;

means for closing the conduit communicating between the container and catch basin closing the exit from said basin whereby the basin holds fluid such that the extended movement of the basin will submerge a portion of the drum in the fluid;

a hose, one end of which is secured to a pump, the other end of said hose adapted to receive a cleaning implement; and pump means for drawing liquid from the container through a pipe within the container, a predetermined distance from the bottom of said container, and dispensing a liquid through the hose and out of the end adapted to receive the cleaning implement.

7. The invention of claim 6 further comprising;

a moveable stand adapted to receive said cleaning device; and a transparent shield capable of extension and retraction, one end of said shield secured to the stand the other free end of the shield having means for securing said free end to the workpiece whereby the user is shielded from the workpiece and cleaning device.

* * * * *